United States Patent [19]
Taniguchi et al.

[11] Patent Number: 6,023,253
[45] Date of Patent: *Feb. 8, 2000

[54] IMAGE DISPLAYING APPARATUS

[75] Inventors: Naosato Taniguchi, Machida; Tsunefumi Tanaka, Yokohama; Yoko Yoshinaga, Kawasaki; Shin Kobayashi, Atsugi; Norihiro Nanba, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/967,261

[22] Filed: Nov. 7, 1997

Related U.S. Application Data

[63] Continuation of application No. 08/329,248, Oct. 26, 1994, abandoned.

[30] Foreign Application Priority Data

Oct. 29, 1993 [JP] Japan .................................. 5-293915
Feb. 9, 1994 [JP] Japan .................................. 6-036546

[51] Int. Cl.$^7$ ..................................................... G09G 5/00
[52] U.S. Cl. ..................................... 345/7; 345/87; 345/8
[58] Field of Search ................................. 345/7, 8, 9, 87, 345/80

[56] References Cited

U.S. PATENT DOCUMENTS

| | | | |
|---|---|---|---|
| 4,028,725 | 6/1977 | Lewis | 358/103 |
| 4,695,163 | 9/1987 | Schachar | 356/369 |
| 4,733,065 | 3/1988 | Hoshi et al. | 250/201 |
| 5,128,794 | 7/1992 | Mocker et al. | 364/514 A |
| 5,181,013 | 1/1993 | Bagshaw et al. | 345/7 |
| 5,327,270 | 7/1994 | Miyatake | 359/63 |
| 5,418,765 | 5/1995 | Misawa et al. | 369/44.12 |
| 5,467,205 | 11/1995 | Kuba et al. | 359/40 |
| 5,579,161 | 11/1996 | Sekiguchi | 359/559 |

FOREIGN PATENT DOCUMENTS

| | | | |
|---|---|---|---|
| 296710 | 12/1988 | European Pat. Off. | 345/7 |
| 4225388 | 8/1992 | Japan | 345/7 |
| 4-330370 | 12/1992 | Japan | G02B 27/02 |

*Primary Examiner*—Richard A. Hjerpe
*Assistant Examiner*—Ronald Laneau
*Attorney, Agent, or Firm*—Morgan & Finnegan LLP

[57] ABSTRACT

The present invention relates to an image displaying apparatus, which comprises a display unit for modulating light incident thereinto in accordance with image information and reflecting the light, an illuminating device for emitting light, and an optical system for guiding a beam of light from the illuminating device into the display unit and guiding a beam of reflected light from the display unit to the observer's pupil located at a position different from that of the illuminating device.

4 Claims, 12 Drawing Sheets

IMAGE DISPLAYING APPARATUS

This is a continuation of application Ser. No. 08/329,248, filed on Oct. 26, 1994 is now abandoned.

BACKGROUND OF THE INVENTION

1. Field of the Invention

The present invention relates to an image displaying apparatus, and more particularly to an image displaying apparatus which is so arranged that a compact optical system having image information (display information), such as a liquid crystal device, is set on the head or in front of the face of an observer whereby the observer can observe the image information as an enlarged virtual image with a wide angle of view.

2. Related Background Art

There are large-scale CRT display apparatus, projection TV apparatus, etc. conventionally used as image displaying apparatus arranged to enable image information displayed on an image display device such as a liquid crystal device to be observed as a picture on a large image plane with presence.

These image displaying apparatus had some problems: they need a large space; a suitable observation distance cannot be secured when installed in a narrow room; it is impossible for individuals to respectively watch different programs; etc.

As an example to solve the problems, Japanese Laid-open Patent Application No. 3-203478 describes an image displaying apparatus, as shown in FIG. 1, which uses an optical system set near the face of an observer to guide a beam from an image display device directly to the eye (observer's pupil) whereby the observer can observe the image information on a large image plane.

Describing the major part of the drawing, 221R, 221L denote liquid crystal color televisions for right eye and for left eye, respectively. Image information displayed on each liquid crystal color television 221R, 221L is reflected by a trapezoid beam splitter (half mirror) 222R (222L, not shown) set in front of either of the eyes, so that part of reflected beams impinge on a concave mirror 223 set ahead. Beams reflected by the concave mirror 223 pass through the beam splitter 222R (222L) to enter the eyes of an observer (not shown).

Then the observer observes the image information displayed on the liquid crystal color televisions 221R, 221L as virtual images at a predetermined position ahead of the concave mirror 223.

Also, the above image displaying apparatus can permit the observer to observe a stereoscopic image while displaying display information with binocular parallax between the right eye and the left eye of observer.

Further, Japanese Laid-open Patent Application No. 4-221920 describes an image displaying apparatus in which a convex lens enlarges a picture displayed on a polarized-light controlling display and in which polarization separating means set in front of the observer's pupil guides the polarized picture into the observer's pupil, whereby an enlarged virtual image can be displayed as superimposed over the external view.

In the conventional image displaying apparatus all the color televisions and the polarized-light controlling displays used as displaying devices were transmission type liquid crystal devices illuminated with backlight.

The liquid crystal devices, for example TFT liquid crystal color televisions, have low aperture rates of about 40% in the cases of liquid crystal panels of currently available products, thus failing to obtain a sufficient transmittance. Then, in order to achieve sufficient display luminance, it was necessary, for example, to increase an intensity of backlight or to provide a sheet multi-lens array on the aperture portion, which was a hindrance to decreasing the size and the weight of the entire apparatus. It was also difficult to decrease the dissipation power because of the need of the high-power backlight.

There are various factors for decreasing the aperture rate of liquid crystal device. For example, main factors are TFT, wiring, auxiliary capacitance, and a portion of black matrix on a color filter covering gaps between them. Then an improvement in aperture rate has been tried for example by decreasing the dimensions of TFT or wiring, decreasing the area of auxiliary capacitance, etc.

However, these methods had the limits due to restrictions in the semiconductor process technology such as the TFT process, which was a problem.

Further, because the conventional image displaying apparatus were so arranged that a liquid crystal panel was observed after enlarged by a lens or a concave mirror, pixels were observed as being very rough. Thus, display quality was insufficient.

To solve this problem, there is a method to increase the density of pixels in the liquid crystal panel. This method, however, had a problem that an increase in density resulted in an increase in number of such elements as TFT and wiring, which lowered the aperture rate.

In addition, a transmission type liquid crystal television needed two polarizing plates arranged in a state of crossed Nicols, which was also a factor to lower the display luminance.

SUMMARY OF THE INVENTION

An object of the present invention is to provide an image displaying apparatus which uses a reflection type display device in a suitable arrangement as a display device, and which enables observation with high definition, high luminance, and a wide angle of view while minimizing the size of the entire apparatus by properly setting constituent elements.

An embodiment of the image displaying apparatus of the present invention for achieving the above object comprises a display unit for modulating light incident thereinto in accordance with image information and reflecting the light, illuminating means for emitting light, and an optical system for guiding a beam of the light from said illuminating means into said display unit and guiding a beam of reflected light from said display unit to the pupil of an observer located at a position different from that of said illuminating means.

A preferred embodiment of the optical system has an optical beam splitter, which directs a beam of light incident thereinto from the illuminating means to the display unit and which directs a beam of reflected light incident thereinto from the display unit to the pupil of the observer.

A preferred embodiment of the display unit has means for modulating polarization of light incident thereinto in accordance with image information.

A preferred embodiment of the optical system has an optical element for changing a beam of light incident from the illuminating means into the display unit, into a beam only of polarized light of predetermined polarization.

A preferred embodiment of the optical beam splitter is a polarization beam splitter.

A preferred embodiment of the optical beam splitter is a half mirror arranged so that a beam of light from the illuminating means is incident thereinto at the Brewster angle.

A preferred embodiment of the image displaying apparatus comprises a pair of the image displaying apparatus corresponding to the left and right pupils of observer.

A preferred embodiment of the illuminating means is commonly used for the pair of image displaying apparatus.

A preferred embodiment of the illuminating means splits a beam of light from a light source portion into two beams by an optical element to illuminate a pair of display units with the two beams thus split.

A preferred embodiment of the illuminating means illuminates a pair of display units each with a beam of parallel rays.

A preferred embodiment of the illuminating means has a light-intensity adjusting element for controlling a transmittance thereof, between the light source portion and the optical element.

A preferred embodiment of the light-intensity adjusting element has a transmittance controlled in accordance with brightness of the external field.

Some specific examples of the image displaying apparatus of the present invention will be detailed as below embodiments.

DETAILED DESCRIPTION OF THE PREFERRED EMBODIMENTS

Figure 1:
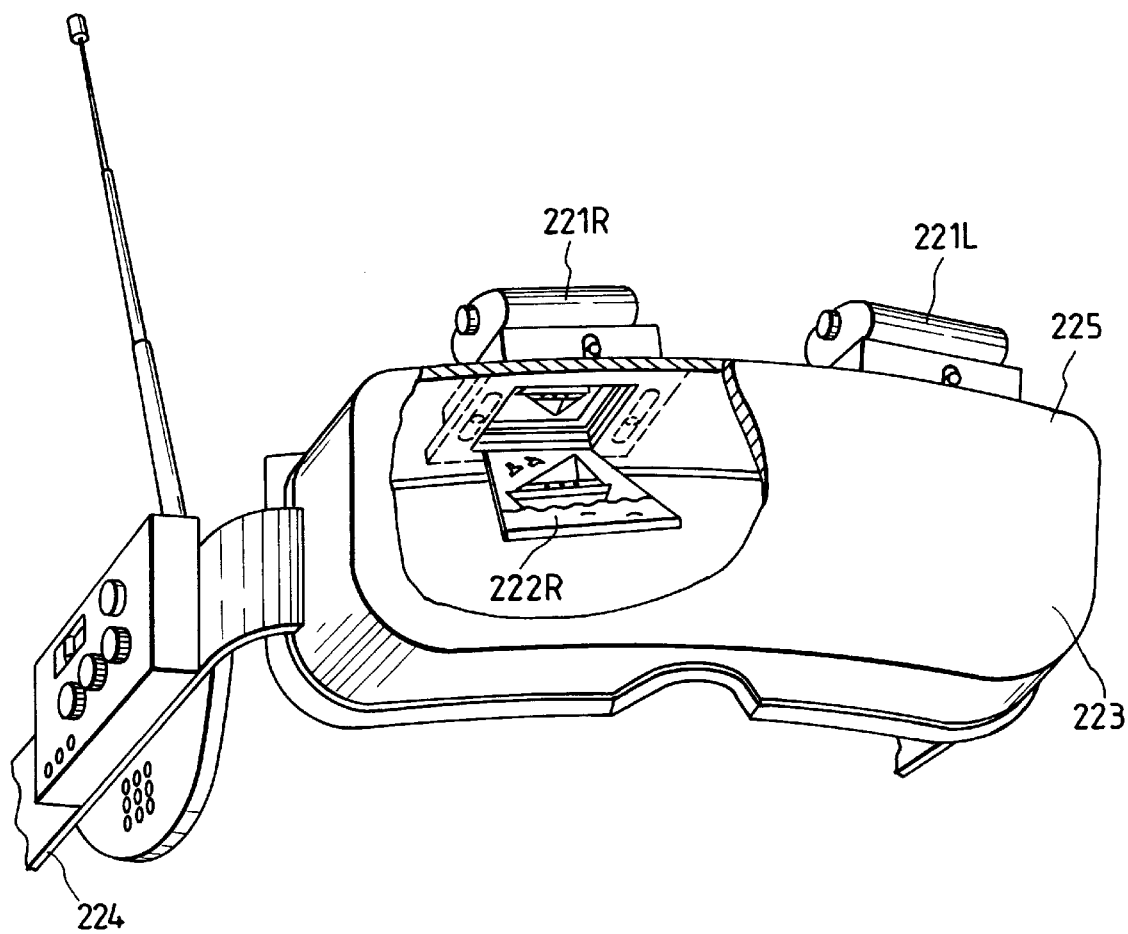
FIG. 1 is a schematic drawing to show major part of a conventional image displaying apparatus.
Figure 2:
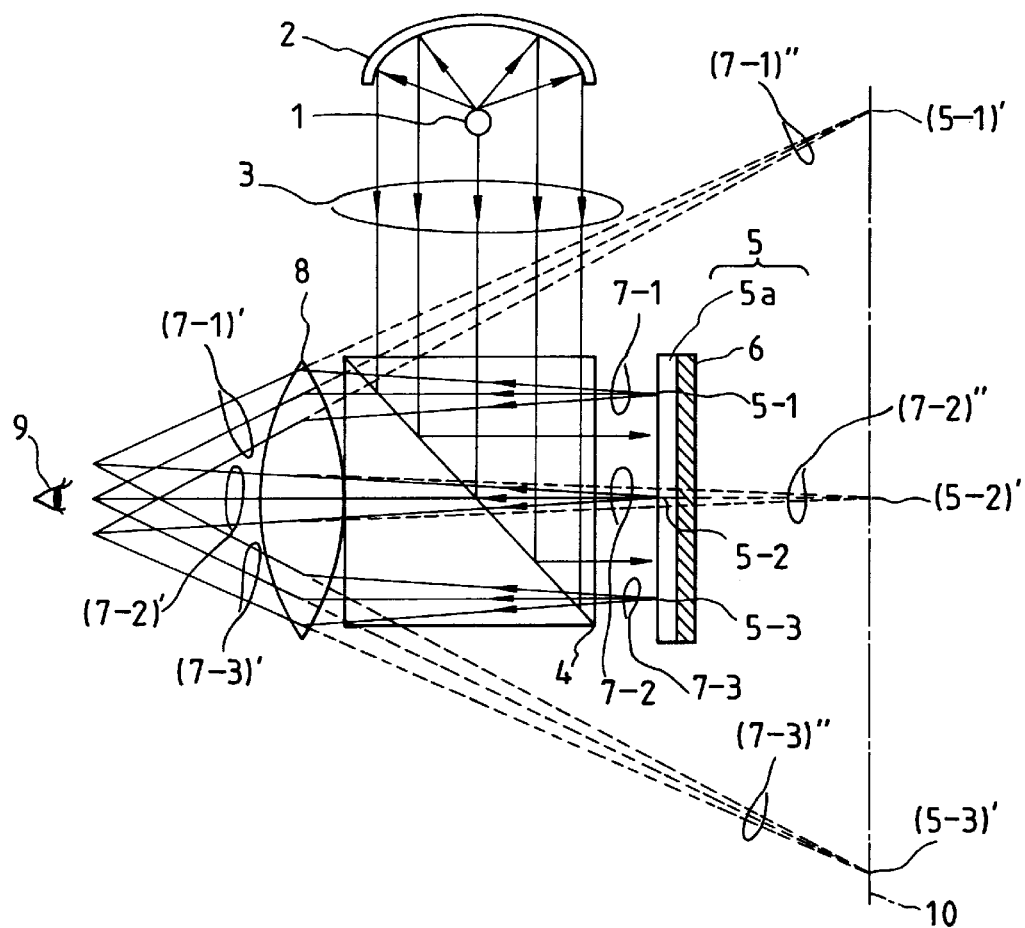
FIG. 2 is a schematic drawing to show major part of embodiment 1 of the present invention.

FIG. 2 is a schematic drawing to show major part of embodiment 1 of the image displaying apparatus according to the present invention.

In the drawing, reference numeral 1 designates a light source such as a fluorescent tube. Numeral 2 denotes a concave reflective mirror, for example a reflective plate such as an elliptic reflective mirror, which reflects backwardly-emitted beams out of those of light emitted from the light source 1, toward an optical beam splitting element 4. The optical beam splitting element 4 is composed of a polarization beam splitter. Numeral 5 designates a display element, which consists of a reflection type liquid crystal device in the present embodiment. The liquid crystal device 5 has a liquid crystal panel 5a and a reflective mirror 6 provided on the back surface of the liquid crystal panel 5a.

In the present embodiment the liquid crystal device 5 is operated in the 45° TN mode and a pixel electrode thereof is also used as a reflection electrode serving as the reflective mirror 6.

Numeral 8 designates a lens system, which is expressed by a single lens element for brevity of illustration but which is actually composed of a plurality of lens elements for the purpose of correcting aberrations and for other purposes. Numeral 9 denotes a pupil position for observation, which corresponds to a position of the observer's eyeball. Numeral 10 represents a plane of a virtual image formed by the lens system 8 from the display information on the display device 5.

Figure 3:
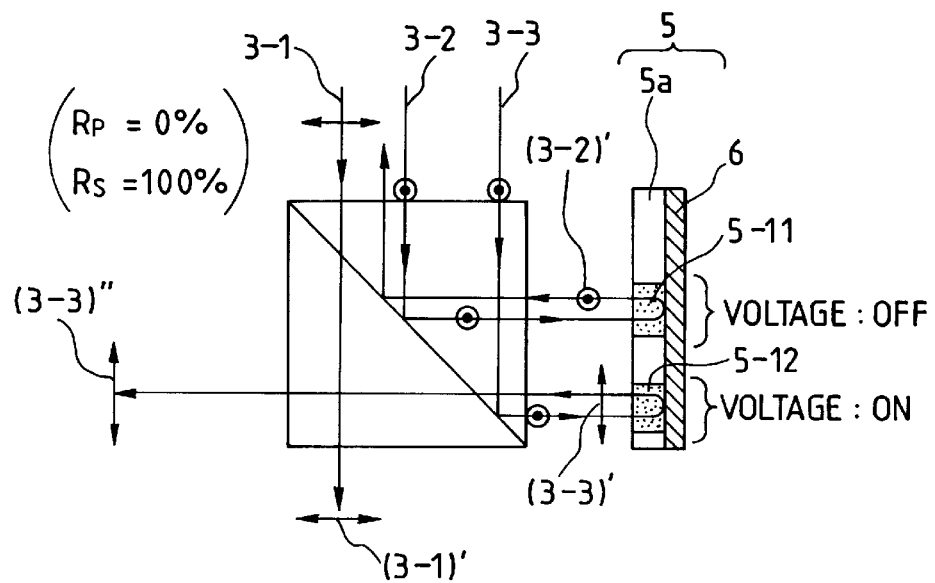
FIG. 3 is an explanatory drawing to show the principle of operation of a liquid crystal display shown in FIG. 2.

First described referring to FIG. 3 is the principle of operation of the reflection type liquid crystal device 5 according to the present invention. A light beam 3 from the light source 1 includes two polarized light components perpendicular to each other, as represented by polarized light 3-1 and polarized light 3-2.

The polarization beam splitter 4 transmits the polarized light (p-polarized light) 3-1 vibrating in parallel with the plane of the drawing, which is thus irrespective of image display at all.

On the other hand, almost all of (100%) the polarized light (s-polarized light) 3-2 and 3-3 vibrating perpendicular to the plane of the drawing is reflected by the polarization beam splitter 4 to enter the liquid crystal panel 5a in the reflection type liquid crystal device 5. The light beam 3-2 incident on a portion 5-11 to which no voltage is applied, on the liquid crystal panel 5a is reflected by the pixel electrode (reflective mirror) 6 constituting the reflection electrode, without modulation of plane of polarization, then to enter the polarization beam splitter 4 while keeping the state of s-polarized light represented by a beam (3-2)'.

Since this polarization beam splitter 4 reflects almost all of (100%) s-polarized light, the s-polarized light returns to the light source 1 without reaching the observer's pupil 9.

On the other hand, when the light beam 3-3 impinges on a portion 5-12 to which a voltage is applied, on the liquid crystal panel 5a, it is modulated in plane of polarization and reflected as p-polarized light represented by a beam (3-3)', then to enter the polarization beam splitter 4. Since the polarization beam splitter 4 transmits almost all of (100%) p-polarized light, the beam is guided as a beam (3-3)" toward the observer's pupil 9.

Based on this, the present embodiment permits the observer to observe the display information displayed on the liquid crystal device 5. The above is the principle of operation of the liquid crystal device 5.

Next described is the image displaying apparatus of the present invention shown in FIG. 2.

Beams emitted from the light source 1 such as a fluorescent tube are changed into nearly parallel beams 3 by the reflective plate 2 having a suitable shape, and the nearly parallel beams 3 enter the polarization beam splitter 4. According to the principle as described above, the polarized light entering the liquid crystal device 5 is modulated only at points (pixels) 5-1, 5-2, 5-3 displaying an image. Then the modulated beams pass through the polarization beam splitter 4 as beams 7-1, 7-2, 7-3 of the display information of reflected, polarized light having the plane of polarization perpendicular to that of the incident polarized light. These beams are converted by the lens system 8 into beams (7-1)', (7-2)', (7-3)', then entering the observer's pupil 9.

On this occasion the power and lens position of the lens system 8 are properly adjusted so that it looks as if the beams (7-1)', (7-2)', (7-3)' are corresponding beams (7-1)", (7-2)", (7-3)" coming from respective points (5-1)', (5-2)', (5-3)' on the virtual image plane 10 a predetermined distance away, whereby the observer can observe the display information displayed on the compact liquid crystal device 5 as a virtual image on a large image plane.

The reflection type liquid crystal device 5 used in the present embodiment has the reflection electrode arranged on the bottom side, which modulates the plane of polarization of the incident polarized light in accordance with the display information. The present embodiment can reduce the loss caused by two polarizing plates (on the entrance side and on the exit side) needed in image displaying apparatus using the conventional transmission type liquid crystal television, and can avoid shield of light due to TFT by the arrangement that the reflection electrode is set above the TFT, whereby the substantial aperture rate is improved and the utilization factor of light is increased several times in total.

Also, the present embodiment can employ a liquid crystal device composed of a transmission type liquid crystal panel, a reflective mirror, and a polarizing plate set between them, as the reflection type liquid crystal device. Since this arrangement uses only one polarizing plate, the utilization factor of light is higher as compared with the conventional image displaying apparatus.

Further, the present embodiment uses the reflective plate 2 for illuminating the reflection type liquid crystal display, but a lens system for illumination may be provided or a combination thereof may be used.

Also, the polarization beam splitter 4 can be directly bonded to the reflection type liquid crystal display 5. Further, if the display information is monochromatic, a plane-parallel polarization beam splitter can be used instead of the cubic polarization beam splitter used in the present embodiment. In addition, a half mirror can be used in place of the polarization beam splitter 4, and in that case a polarizing plate is to be provided on the light source side and another on the liquid crystal device for aligning parallel components of illumination light 3.

Figure 4:
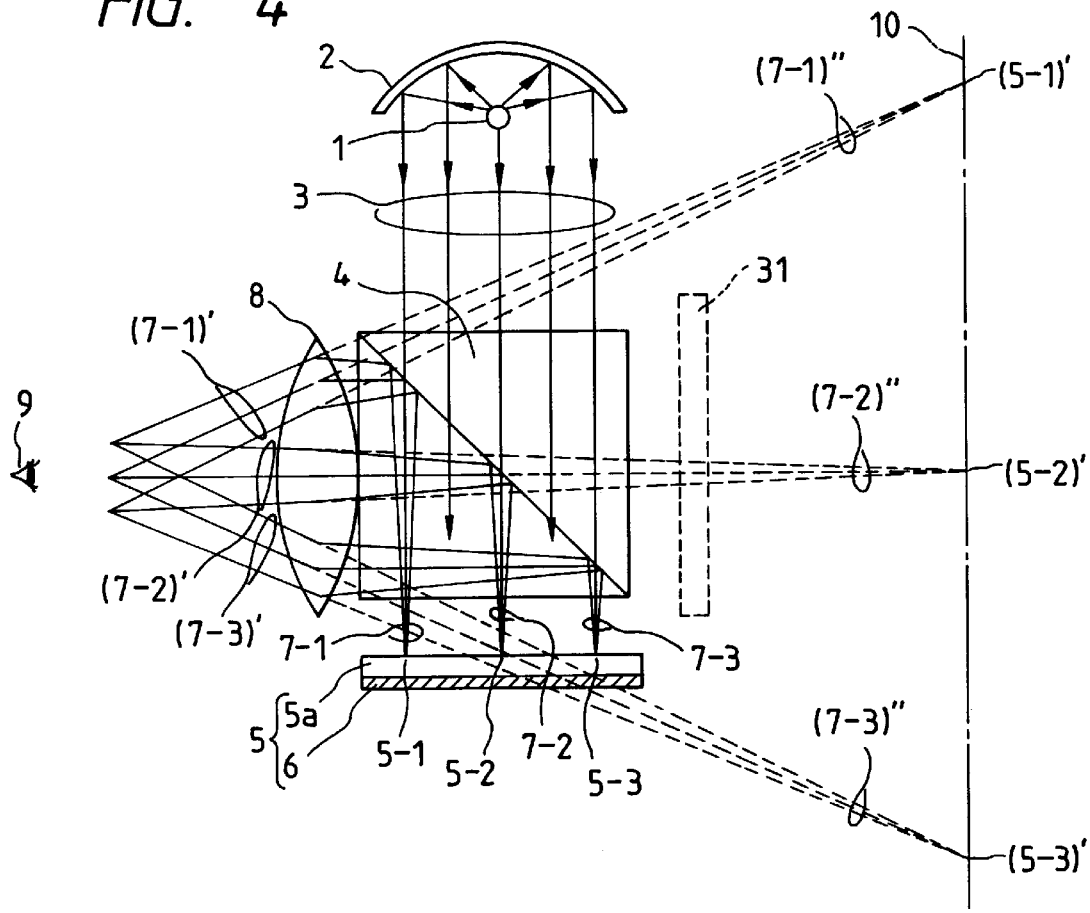
FIG. 4 is a schematic drawing to show major part of embodiment 2 of the present invention.

FIG. 4 is a schematic drawing to show major part of embodiment 2 of the image displaying apparatus according to the present invention.

The present embodiment is constructed substantially in the same structure as embodiment 1 shown in FIG. 2 except that among the beams from the illumination light source 1 those transmitted by the polarization beam splitter 4 are made to enter the reflection type liquid crystal device 5.

In FIG. 4 the same elements are denoted by the same reference numerals as those in FIG. 2.

Figure 5:
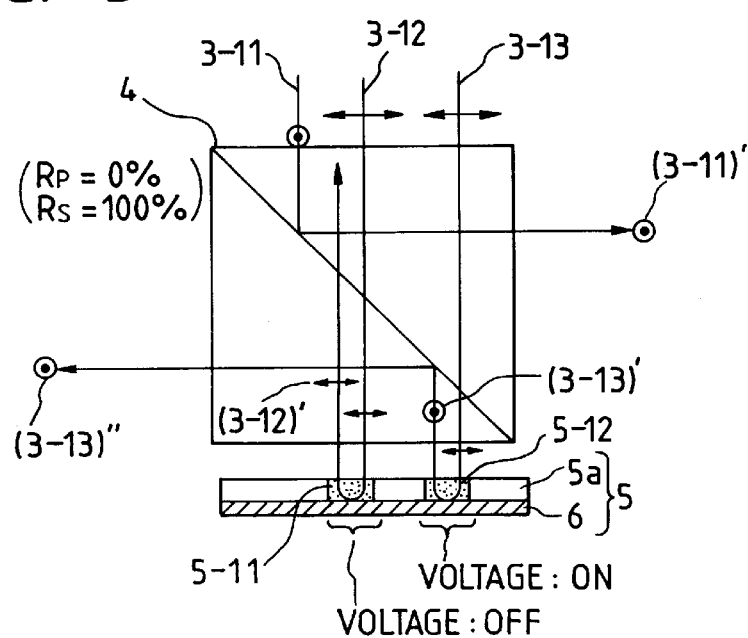
FIG. 5 is an explanatory drawing to show the principle of operation of a liquid crystal display shown in FIG. 4.

Next described referring to FIG. 5 is the principle of operation of the reflection type liquid crystal device 5 in the present embodiment.

The light 3 from the light source 1 includes two components of polarized light perpendicular to each other, as represented by polarized light 3-11 and polarized light 3-12. Among them, the polarization beam splitter 4 reflects almost all of the polarized light (s-polarized light) 3-11 vibrating perpendicular to the plane of the drawing to obtain a beam (3-11)' having nothing to do with image display.

On the other hand, the polarization beam splitter 4 transmits the polarized light (p-polarized light) 3-12 and 3-13 vibrating in parallel with the plane of the drawing, which is incident into the liquid crystal panel 5a in the reflection type liquid crystal device 5.

A beam 3-12 incident on a portion 5-11 to which no voltage is applied, on the liquid crystal panel 5a is reflected by the reflective mirror 6 of the pixel electrode forming the reflection electrode, without modulation of plane of polarization, then to enter the polarization beam splitter 4 while keeping the state of p-polarized light represented by a beam (3-12)'.

Since the polarization beam splitter 4 transmits almost all of (100%) p-polarized light, it returns to the light source 1 side without reaching the observer's pupil 9.

Next, a beam 3-13 incident on a portion 5-12 to which a voltage is applied, on the liquid crystal panel 5a is reflected while modulated in plane of polarization, to become s-polarized light represented by a beam (3-13)', then entering the polarization beam splitter 4. Since the polarization beam splitter 4 reflects almost all (100%) of s-polarized light, it is guided as a beam (3-13)" toward the observer's pupil 9.

The above arrangement permits the observer to observe the display information displayed on the liquid crystal device 5. The above explained the principle of operation of liquid crystal device 5.

Next described is the image displaying apparatus of the present embodiment shown in FIG. 4. Beams from the light source 1 such as a fluorescent tube are converted into nearly parallel beams 3 by the reflective plate 2 having a suitable shape, and the parallel beams then enter the polarization beam splitter 4. According to the principle as described above, the polarized light incident into the liquid crystal display 5 is then modulated only at points (pixels) 5-1, 5-2, 5-3 displaying an image. The polarized light is reflected by the polarization beam splitter 4 as beams 7-1, 7-2, 7-3 of the display information of reflected, polarized light having the plane of polarization perpendicular to that of the incident polarized light.

The lens system 8 converts these beams into beams (7-1)', (7-2)', (7-3)', and the converted beams enter the observer's pupil 9. On this occasion the power and lens position of the lens system 8 are properly set so that the observer observes the beams (7-1)', (7-2)', (7-3)' as if to observe corresponding beams (7-1)", (7-2)", (7-3)" from respective points (5-1)', (5-2)', (5-3)' on the virtual image plane 10 a predetermined distance away, whereby the observer can observe the image on the compact display device 5 as a virtual image on a large image plane.

In the drawing, numeral 31 designates a liquid crystal shutter or a polarizing plate. Adjusting a voltage applied to the liquid crystal shutter or rotating the axis of polarization of the polarizing plate, the relation with the axis of polarization of the polarization beam splitter 4 is adjusted to change a transmittance of light from ahead, so that the observer can observe the display image with good contrast even if the external field has high luminance.

Since the present embodiment is so arranged that the liquid crystal device 5 is set below the polarization beam splitter 4, the observer can observe the external field in the direction of visual axis over the lens system 8 and the polarization beam splitter 4. Thus, the observer can observe the front view to the extent that the observer can sense a change in brightness ahead or to the extent that the observer can recognize something approaching, thereby presenting an advantage that the observer can recognize a danger or the like ahead thereof even if he or she is wearing the image displaying apparatus of the present invention.

Figure 6:
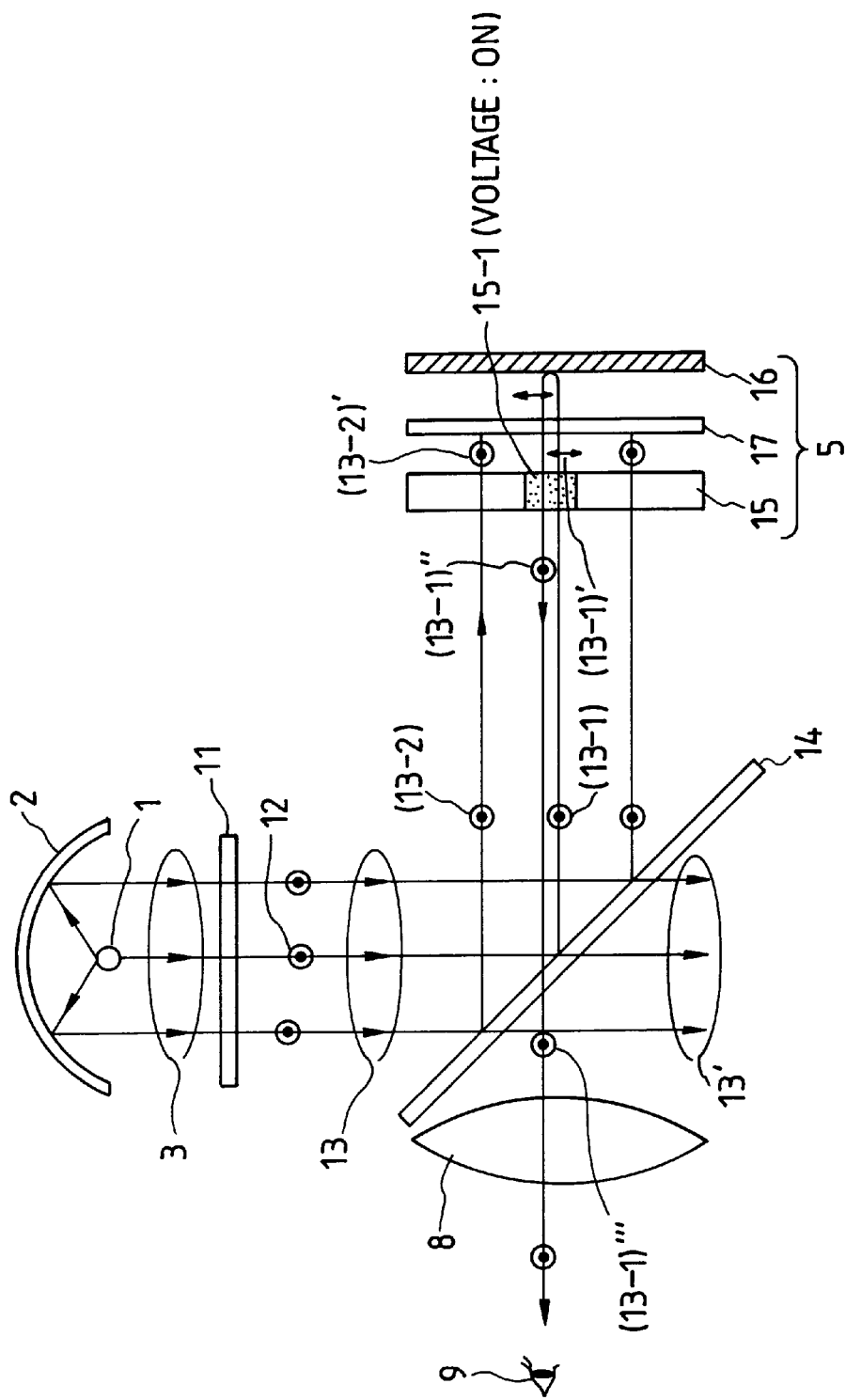
FIG. 6 is a schematic drawing to show major part of embodiment 3 of the present invention.

FIG. 6 is a schematic drawing to show major part of embodiment 3 of the image displaying apparatus according to the present invention.

The present embodiment is constructed substantially in the same structure as embodiment 1 shown in FIG. 2 except that a half mirror 14 replaces the polarization beam splitter 4 and that the reflection type liquid crystal device 5 is composed of a transmission type liquid crystal panel 15, a reflective mirror 16, and a polarizing plate 17 arranged between them.

In FIG. 6, the same elements are denoted by the same reference numerals as those in FIG. 2.

In FIG. 6, numeral 11 denotes a polarizing plate, which aligns polarization components of illumination light 3 from the light source 1 into polarized light (s-polarized light) vibrating perpendicular to the plane of the drawing. Numeral 14 is a half mirror. Numeral 15 is a transmission type liquid crystal panel and 16 a reflective mirror. Numeral 17 designates a polarizing plate as an analyzer arranged between the liquid crystal panel 15 and the reflective mirror 16.

In the present embodiment, beams from the light source 1 such as a fluorescent tube are converted into nearly parallel beams 3 by the reflective plate 2 having a suitable shape, and the polarizing plate 11 then aligns the polarization components of illumination light 3 into polarized light (s-polarized light) vibrating perpendicular to the plane of the drawing (as represented by 12 in the drawing).

This s-polarized light 13 is split into two by the half mirror 14, and light beams reflected thereby illuminate the liquid crystal panel 15. (On the other hand, beams 13' transmitted by the half mirror 14 have nothing to do with image display.) Among the s-polarized light entering the liquid crystal panel 15, a beam 13-2 incident on a portion to which no voltage is applied, on the liquid crystal panel 15 passes through the liquid crystal panel 15 without modulation of plane of polarization as keeping the state of s-polarization, to become s-polarized light (13-2)', which is then cut by the polarizing plate 17.

On the other hand, a beam 13-1 incident on a portion 15-1 to which a voltage is applied, on the liquid crystal panel 15 is modulated in plane of polarization to pass through the liquid crystal panel 15 to become another polarized light (p-polarized light) having the plane of polarization perpendicular to that of the s-polarized light and shown by the beam (13-1)', thus passing through the polarizing plate 17.

The light passing through the polarizing plate 17 is reflected by the reflective mirror 16, then passes through the polarizing plate 17, and is modulated in plane of polarization by the liquid crystal panel 15 to become light (13-1)" with the same plane of polarization as the s-polarized light. The modulated beam passes through the half mirror 14 to be guided through the lens system 8 into the observer's pupil 9.

As described, the polarized light entering the liquid crystal panel 15 is modulated only at points (pixels) displaying an image to become display information light, which is reflected to return. By this arrangement, the observer can observe the display information on the compact liquid crystal device 5 as a virtual image on a large image plane a predetermined distance away, through the lens system 8.

Figure 7:
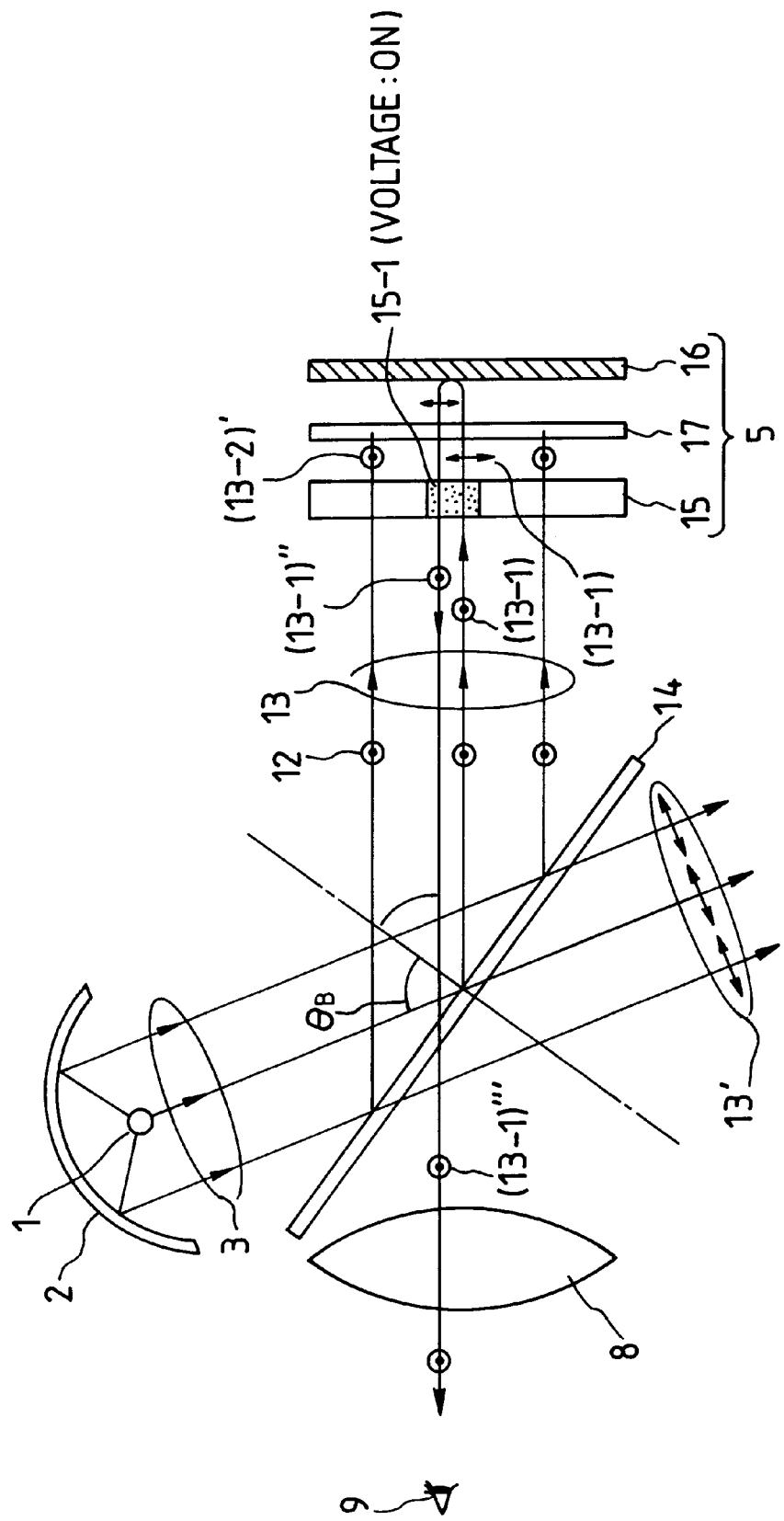
FIG. 7 is a schematic drawing to show major part of embodiment 4 of the present invention.

FIG. 7 is a schematic drawing to show major part of embodiment 4 of the image displaying apparatus according to the present invention.

The present embodiment is constructed substantially in the same structure as embodiment 3 shown in FIG. 6 except that illumination light beams 3 from the illumination light source 1 are arranged to be incident at the Brewster angle into the half mirror 14. The present embodiment utilizes the polarization dependence of reflectivity (i.e., the property that the reflectivity of p-polarized light is zero) when the light is incident at the Brewster angle, thereby enabling higher-luminance display as compared with embodiment 3, without using the polarizing plate 11 for aligning polarization components of illumination beams 3 into polarized light (s-polarized light) vibrating perpendicular to the plane of the drawing.

In FIG. 7, the same elements are denoted by the same reference numerals as those shown in FIG. 6.

The embodiment of FIG. 7 is next described mainly about different points from embodiment 3 of FIG. 6.

Beams from the light source 1 are converted into nearly parallel beams 3 by the reflective plate 2 having a suitable shape, and the nearly parallel beams 3 are incident at the Brewster angle $\theta_B$ into the half mirror 14. This half mirror 14 is simply a plane-parallel plate with a refractive index of 1.5 the surfaces of which are not coated with an antireflection layer. The Brewster angle $\theta_B$ is about 56°, the reflectivity of s-polarized light is about 25.8%, and little p-polarized light is reflected.

As a consequence, the illumination beams 3 reflected by the half mirror 14 are only polarized beams 13 of s-polarization (as shown by 12 in the drawing), which enter the liquid crystal device 5.

As described previously, the s-polarized light entering the liquid crystal panel 15, for example a beam 13-1, is modulated only at a point (pixel) 15-1 displaying an image, to become p-polarized light as display information. The p-polarized light travels via the polarizing plate 17, the reflective mirror 16, and the polarizing plate 17 in order and is then modulated at the point 15-1 into s-polarized light (13-1)". The s-polarized light (13-1)" is again incident on the half mirror 14.

An angle of incidence of this display information light is also about the Brewster angle $\theta_B$. The transmittance of s-polarized light of the half mirror 14 is about 74.2% (Ts=1−0.258=0.742). Thus, the s-polarized light (13-1)" passes through the half mirror 14 at this transmittance to be incident through the lens system 8 into the observer's pupil 9.

As described, the observer can observe the display information on the compact liquid crystal device 5 through the lens system 8 as a virtual image on a large image plane a predetermined distance away.

As described, the present embodiment uses the half mirror 14 arranged at such an angle that the beams are incident at the Brewster angle thereinto whereby the half mirror 14 can serve as the two polarizing plates (on the entrance side and on the exit side) for liquid crystal device, as conventionally needed, thus simplifying the entire apparatus.

Next described are utilization factors of light in the present embodiment and embodiment 3 of FIG. 6.

In embodiment 3 of FIG. 6, the illumination beams 3 pass through the polarizing plate 11 with a transmittance of about 40% and then are reflected by the half mirror 14 with a reflectivity of 50%.

Here, let RLCD be a reflectivity of the total reflection type liquid crystal display 5 composed of the liquid crystal panel 15, the polarizing plate 17, and the reflective mirror 16. Reflected beams again pass through the half mirror 14 to reach the observer's pupil 9. Then, letting I be light intensity of illumination beams 3, the utilization factor of light in embodiment 3 is as follows:

$$I \times 0.4 \times 0.5 \times RLCD \times 0.5 = 0.10 \times RLCD \times I.$$

On the other hand, in embodiment 4 the illumination beams 3 are subjected to filtering by the half mirror 14 to extract only the s-polarized light, the reflectivity of which is 25.8%. After reflected by the reflection type liquid crystal device with the reflectivity of RLCD, the light passes through the half mirror 14 with a transmittance of s-polarized light of 74.2% to reach the observer's pupil 9. Consequently, the utilization factor of light in embodiment 4 is as follows:

$$I \times 0.258 \times RLCD \times 0.742 = 0.19 \times RLCD \times I.$$

As seen, the light utilization factor of embodiment 4 is almost the double of that of embodiment 3. The half mirror used in embodiment 4 is simply a plane-parallel plate with a refractive index of 1.5 and without coating of an anti-reflection layer and further, no polarizing plate is needed in embodiment 4, thus achieving an advantage that the cost of entire apparatus can be reduced.

Figure 8:
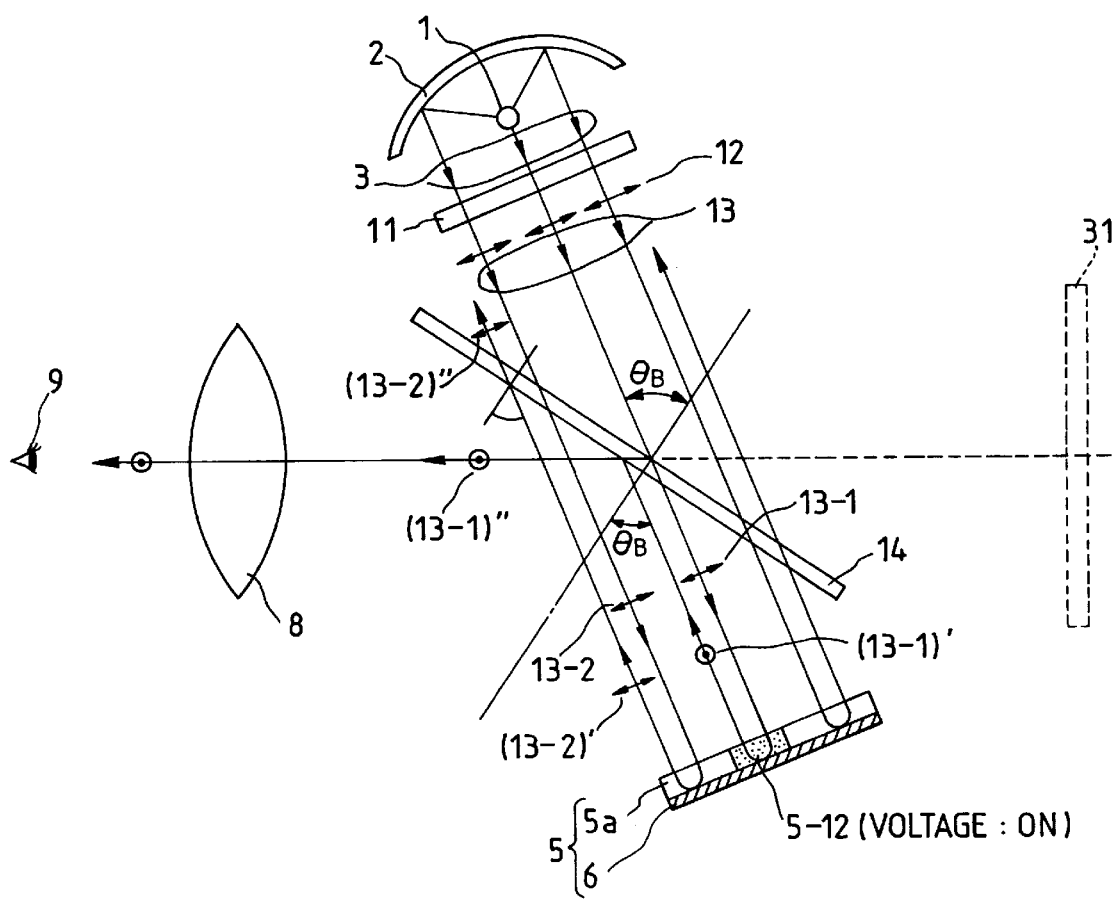
FIG. 8 is a schematic drawing to show major part of embodiment 5 of the present invention.

FIG. 8 is a schematic drawing to show major part of embodiment 5 of the image displaying apparatus according to the present invention.

The present embodiment is constructed substantially in the same structure as embodiment 4 of FIG. 7 except that the parallel beams 13 from the illumination light source 1 are let to once pass through the half mirror 14 and thereafter to enter the reflection type liquid crystal device 5 and that the reflection type liquid crystal device 5 has the pixel electrode as a reflection electrode (reflective mirror) 6.

The present invention will be described mainly about different points from embodiment 4. Beams from the light source 1 are converted into nearly parallel beams 3 by the reflective plate 2 having a suitable shape, and the nearly parallel beams 3 then enter the polarizing plate 11. Polarization components of beams 3 are aligned by the polarizing plate 11 into polarized light (p-polarized light) 13 vibrating in parallel with the plane of the drawing (as shown by 12 in the drawing), and then the polarized light 13 is incident at the Brewster angle $\theta_B$ into the half mirror 14. The half mirror 14 is simply a plane-parallel plate with a refractive index of 1.5 the surfaces of which are not coated with an anti-reflection layer.

The Brewster angle $\theta_B$ is about 56° in this case. Almost all of (100%) p-polarized light 13 is transmitted to become beams 13-1 and 13-2.

The principle of operation of the reflection type liquid crystal device 5 in the present embodiment is exactly the same as that of FIG. 5. For example, only a beam 13-1 incident on a portion 5-12 to which a voltage is applied, on the liquid crystal panel 5a is modulated in plane of polarization to be reflected, and the reflected light becomes s-polarized light represented by a beam (13-1)' to be again incident at the Brewster angle into the half mirror 14.

In this case the half mirror 14 reflects about 25.8% of s-polarized light. Thus, the s-polarized light (13-1)' is reflected by the half mirror 14 to be incident as a beam (13-1)" into the observer's pupil 9.

As described, the present embodiment uses the half mirror 14 arranged at such an angle that the beams are incident at the Brewster angle thereinto, which serves as the (exit side) polarizing plate (analyzer) for liquid crystal device, as conventionally needed.

The light utilization factor in the present embodiment is obtained similarly as in the previous embodiments. Let the transmittance of polarizing plate 11 be about 40%, the transmittance of p-polarized light of the half mirror 14 be 100%, the overall reflectivity of the liquid crystal panel 5a and the reflection electrode 6 be R'LCD, and the light intensity of illumination beams 3 be I. Since the reflectivity of s-polarized light as image light at the half mirror 14 is 25.8%, the utilization factor is as follows:

$$I \times 0.4 \times 1 \times R'LCD \times 0.258 = 0.10 \times R'LCD \times I.$$

Since the reflection type liquid crystal display 5 used in the present embodiment needs no polarizing plate, different from embodiment 4 of FIG. 7, the relation of reflectivity is defined as R×LCD>RLCD. Comparing with embodiment 4 of FIG. 7 in which the light passes the polarizing plate with a transmittance of about 40% twice in go and return paths, the relation of R'LCD=6.25 RLCD can be achieved. Thus, the light utilization factor of the present embodiment becomes about 0.625×RLCD×I, achieving a further higher light utilization factor than that of embodiment 4 of FIG. 7.

The reflection type liquid crystal device 5 used in the present embodiment has the reflection electrode arranged on the bottom side, which performs only modulation of plane of polarization of incident, polarized light in accordance with display information. Thus, the arrangement of the present embodiment can reduce the loss in two polarizing plates (on the entrance side and on the exit side) needed for display devices using the conventional transmission type liquid crystal television. In addition, because the reflection electrode is arranged above TFT, no light is shielded by the TFT. Therefore, the substantial aperture rate is improved by the arrangement of the present embodiment, thus enhancing the light utilization factor several times in total.

In the present embodiment a liquid crystal shutter or a polarizing plate may be provided at position 31 in the drawing so as to adjust a transmittance of light from the external field, thus enabling adjustment of contrast of display information.

Because the present embodiment is so arranged that the liquid crystal device 5 is located below the half mirror 14, the observer can observe the external field in the direction of visual axis over the lens system 8 and the half mirror 14. Consequently, the observer can observe the front view to the extent that the observer can sense a change in brightness ahead thereof or to the extent that the observer can recognize something approaching. Therefore, the present embodiment has such an advantage that the observer can recognize a danger or the like ahead thereof even if the observer is wearing the image displaying apparatus of the present invention.

Figure 9:
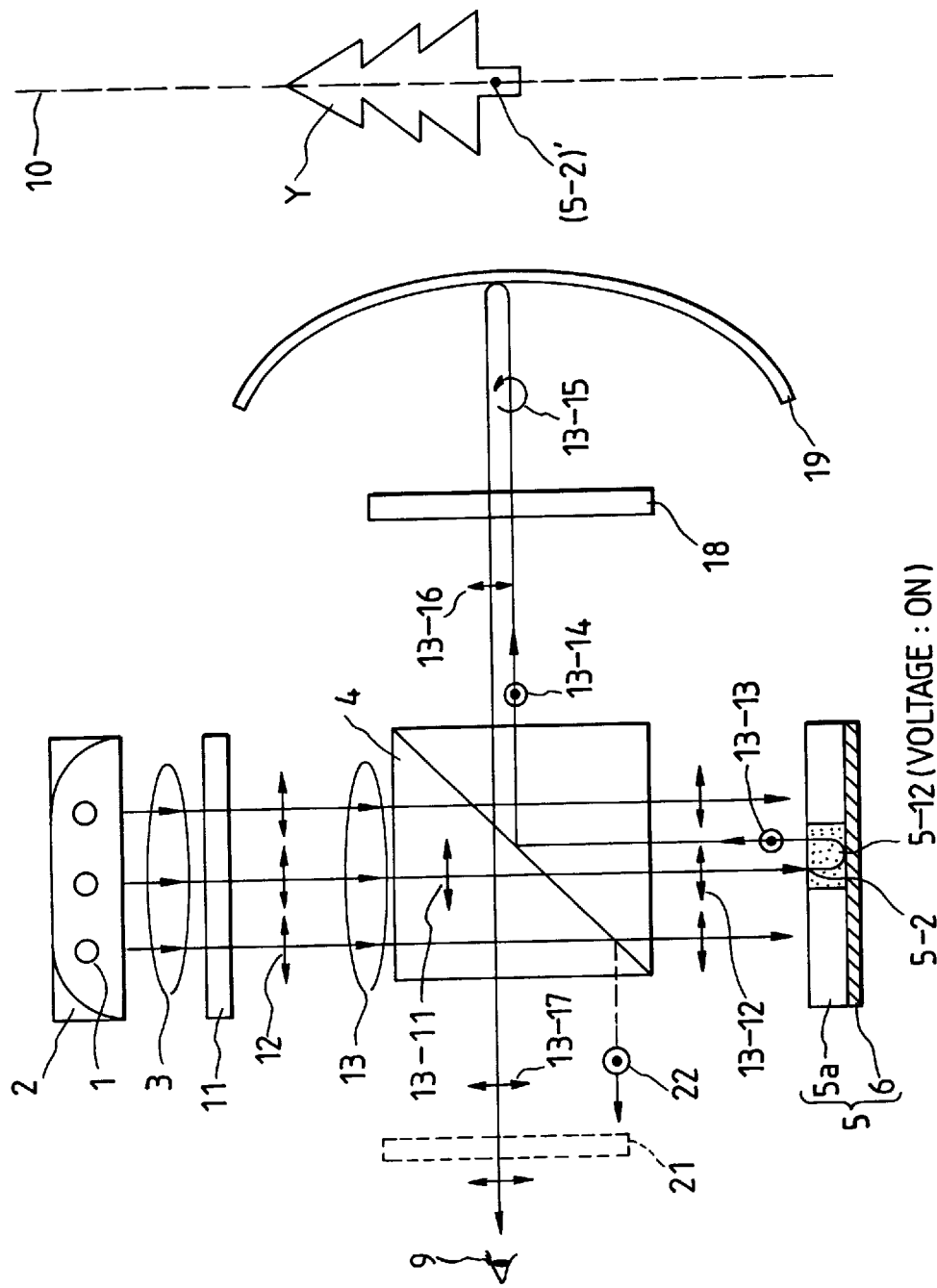
FIG. 9 is a schematic drawing to show major part of embodiment 6 of the present invention.

FIG. 9 is a schematic drawing to show major part of embodiment 6 of the image displaying apparatus according to the present invention. The present embodiment is constructed substantially in the same structure as embodiments 1 to 5 except that an optically transparent beam combining element 19 is used to combine two information, display information from the display element 5 and image information Y, for example, such as a scene of external field, located in a direction different from that of the display information, with each other so that the observer can observe the combined information in a same field in a spatially superimposed manner.

In FIG. 9 the same elements are denoted by the same reference numerals as those shown in FIG. 2. In FIG. 9, numeral 1 designates a light source such as a fluorescent tube. Numeral 2 is a reflective plate such as a concave reflective mirror. Numeral 11 is a polarizing plate, which aligns polarization components of beams 3 from the light source 1 into polarized light (p-polarized light) 13 vibrating in parallel with the plane of the drawing (as shown by 12 in the drawing). Numeral 5 denotes a reflection type liquid crystal device provided with a liquid crystal panel 5a and a reflective mirror 6.

In the present embodiment, the liquid crystal device 5 is operated in the 45° TN mode and the pixel electrode is a reflection electrode, serving as a reflective mirror 6. Numeral 4 is an optical beam splitting element, which is a polarization beam splitter. Numeral 18 denotes a quarter wave plate, which converts linearly polarized light incident thereinto into circularly polarized light. Numeral 19 is an optically transparent beam combining element, which is a concave half mirror with a reflectivity of about 50% and a transmittance of about 50%.

The concave half mirror 19 has optically positive power, and the curvature thereof is properly determined. An aspherical surface can be used as the surface of concave half mirror 19 in order to correct aberrations, but the surface of concave half mirror 19 is assumed herein to be a concave surface (spherical surface) for simplicity of description.

Numeral 9 represents the pupil position for observation, which corresponds to the position of the observer's eyeball. Numeral 10 denotes a plane of a virtual image formed by the concave half mirror 19 from the display information displayed on the liquid crystal device 5, and Y represents image information such as a natural scene.

In the present embodiment, beams from the light source 1 such as a fluorescent tube are converted into nearly parallel beams 3 by the reflective plate 2 having a suitable shape, and the polarizing plate 11 aligns polarization components of beams 3 into polarized light (p-polarized light) 13 vibrating in parallel with the plane of the drawing (as shown by 12 in the drawing). Almost all of (100%) p-polarized light 13 passes through the polarization beam splitter 4 to enter the reflection type liquid crystal device 5.

The principle of operation of the reflection type liquid crystal device 5 in the present embodiment is exactly the same as that described with FIG. 5.

In detail, only a beam 13-12 incident on a portion 5-12 to which a voltage is applied, on the liquid crystal panel 5a is modulated in plane of polarization to be reflected, and the reflected beam becomes s-polarized light shown by a beam 13-13 to again enter the polarization beam splitter 4. Almost all of (100%) the display information light of the s-polarized light is reflected by the polarization beam splitter 4 to become a beam 13-14. The beam 13-14 is guided toward the concave half mirror 19 located as opposed to the observer's pupil 9.

The quarter wave plate 18 is set in the optical path between the polarization beam splitter 4 and the concave half mirror 19 to convert the display information light 13-14 of s-polarized light into circularly polarized light 13-15.

The display information light is reflected by the concave half mirror 19, and the reflected light again passes through the quarter wave plate 18 to become display information light 13-16 of p-polarized light. Almost all of the display information light 1316 passes through the polarization beam splitter 4 to enter the observer's pupil 9.

In this arrangement, the curvature and the position of the concave half mirror 19 are properly determined so that the observer can observe the display image on the compact liquid crystal device 5 as a virtual image on a large image plane at the position 10 a predetermined distance away.

Also, the observer can observe the image information Y such as a natural scene located in a direction different from that of the display image displayed on the liquid crystal device 5, through the concave half mirror 19 in a same field as if it is spatially superimposed on the virtual image of the display image on the liquid crystal device 5.

The present embodiment may be modified in such a manner that the polarizing plate 11 for aligning the polarization components of beams 3 into polarized light (p-polarized light) vibrating in parallel with the plane of the drawing (as shown by 12 in the drawing) is set at 21 immediately before the observer's pupil 9, instead of the position between the light source 1 and the polarization beam splitter 4.

In that case, the axis of polarization of the polarizing plate 11 should be arranged so as to transmit the polarized light (image information light) 13-17. This arrangement makes almost all of the s-polarized light unnecessary for display image among the illumination beams 3 reflected by the polarization beam splitter 4 (and the reflected light, if any, as represented by 22 in the drawing all is cut by the polarizing plate 21), thus preventing it from entering the observer's pupil 9. Further, this arrangement can lower the light intensity loss of illumination light 3 due to transmission through the polarizing plate 11, presenting a feature that the display luminance can be enhanced.

Figure 10:
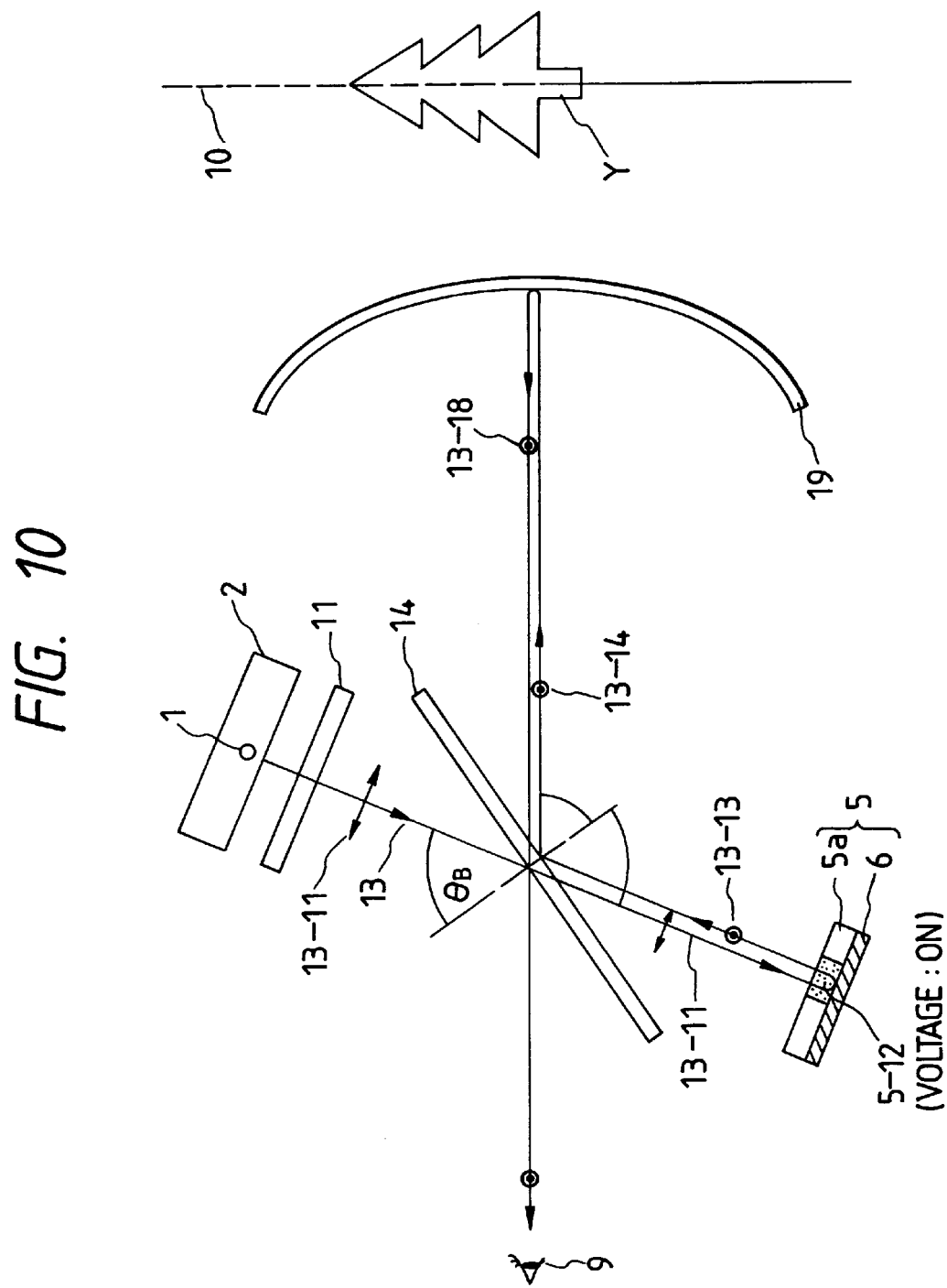
FIG. 10 is a schematic drawing to show major part of embodiment 7 of the present invention.

FIG. 10 is a schematic drawing to show major part of embodiment 7 of the image displaying apparatus according to the present invention.

The present embodiment is constructed substantially in the same structure as embodiment 6 of FIG. 9 except that a half mirror replaces the polarization beam splitter 4 and that illumination light 13 from the illumination light source 1 is incident at the Brewster angle $\theta_B$ into the half mirror 14.

In FIG. 10, the same elements are denoted by the same reference numerals as those shown in FIG. 9.

In the present embodiment, beams from the light source 1 such as a fluorescent tube are converted into nearly parallel beams 3 by the reflective plate 2 having a suitable shape, and polarization components of beams 3 are aligned by the polarizing plate 11 into polarized light (p-polarized light) 13 vibrating in parallel with the plane of the drawing (as shown by 13-11 in the drawing). This p-polarized light 13 is incident at the Brewster angle $\theta_B$ into the half mirror 14. The half mirror 14 is simply a plane-parallel plate with a refractive index of 1.5, the surfaces of which are not coated with an anti-reflection layer. In this case, the Brewster angle $\theta_B$ is about 56°, and almost all of (100%) p-polarized light 13 is transmitted.

The principle of operation of the reflection type liquid crystal device 5 in the present embodiment is exactly the same as that explained with FIG. 5. Namely, only a beam 13-11 incident on a portion 5-12 to which a voltage is applied, on the liquid crystal panel 5a is modulated in plane of polarization to be reflected. The reflected beam becomes s-polarized light shown by a beam 13-13, which is again incident at the Brewster angle into the half mirror 14.

On this occasion, the half mirror 14 reflects about 25.8% of the s-polarized light to guide a reflected beam 13-14 toward the concave half mirror 19 set at a position opposed to the observer's pupil 9.

The display information light 13-14 is reflected by the concave half mirror 19 and is incident as a beams 13-18 at the Brewster angle $\theta_B$ into the half mirror 14. On this occasion, the transmittance of s-polarized light at the Brewster angle is 74.2%. Thus, the s-polarized light 13-18 is transmitted at this transmittance by the half mirror 14 then to enter the observer's pupil 9.

In the present embodiment the curvature and the position of the concave half mirror 19 are also properly determined similarly as in embodiment 6 of FIG. 9, so that the observer can observe the display image on the compact liquid crystal device 5 as a virtual image on a large image plane at the position 10 a predetermined distance away.

Also, the observer observes the image information Y such as a natural scene located in a direction different from that of the display image displayed on the liquid crystal device 5 through the concave half mirror 19 in a same field as spatially superimposed on the virtual image of the display image on the liquid crystal device 5.

Each of the above embodiments 6, 7 may be modified in such a manner that two observation systems are prepared to supply display information with binocular parallax to associated liquid crystal devices 5 and that the observer observes the display information through the right eye and the left eye, thereby enabling to observe the display information with stereoscopic effect.

Figure 11:
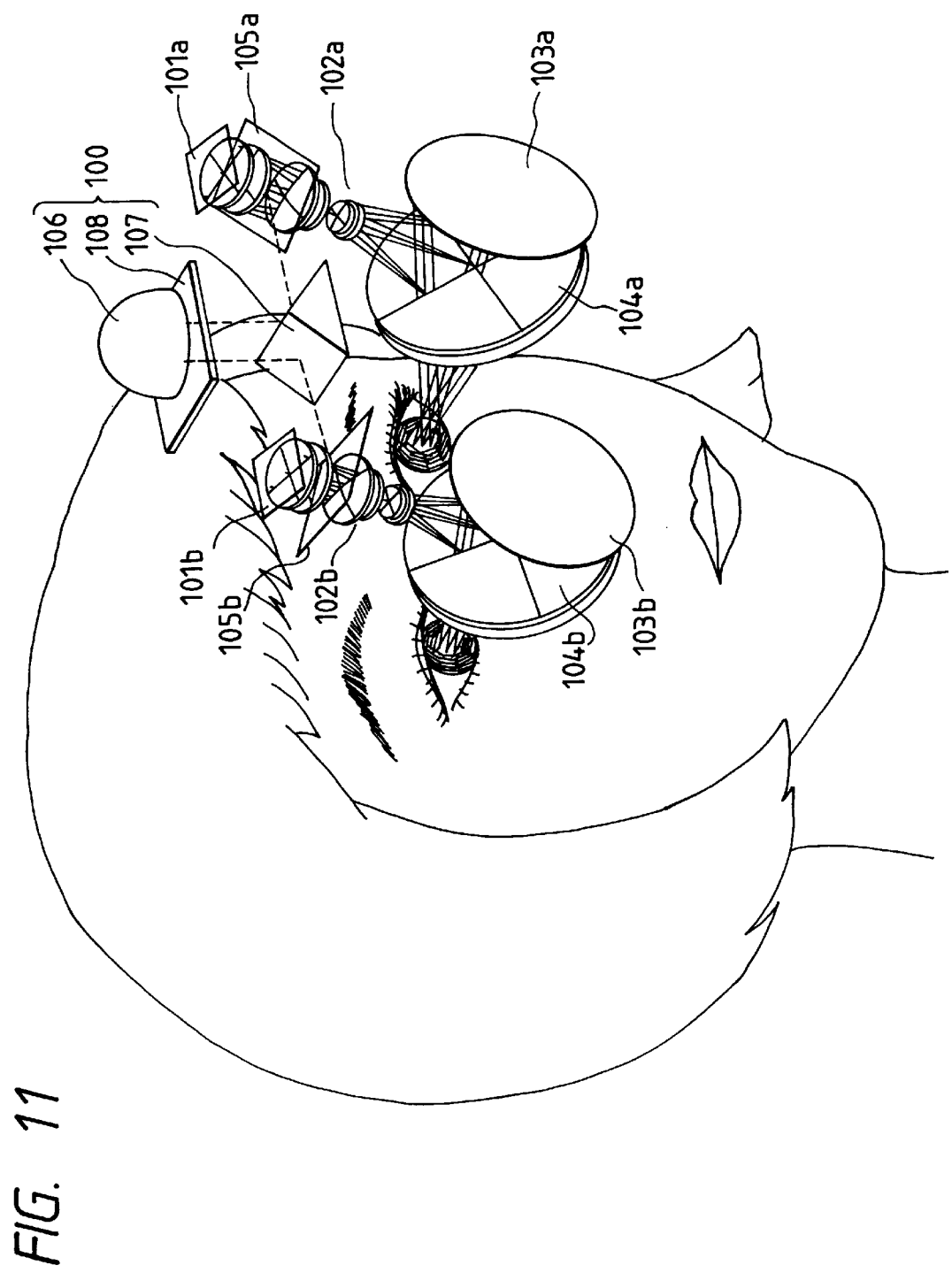
FIG. 11 is a schematic drawing to show major part of embodiment 8 of the present invention.

FIG. 11 is a schematic drawing to show major part of embodiment 8 of the present invention.

Figure 12:
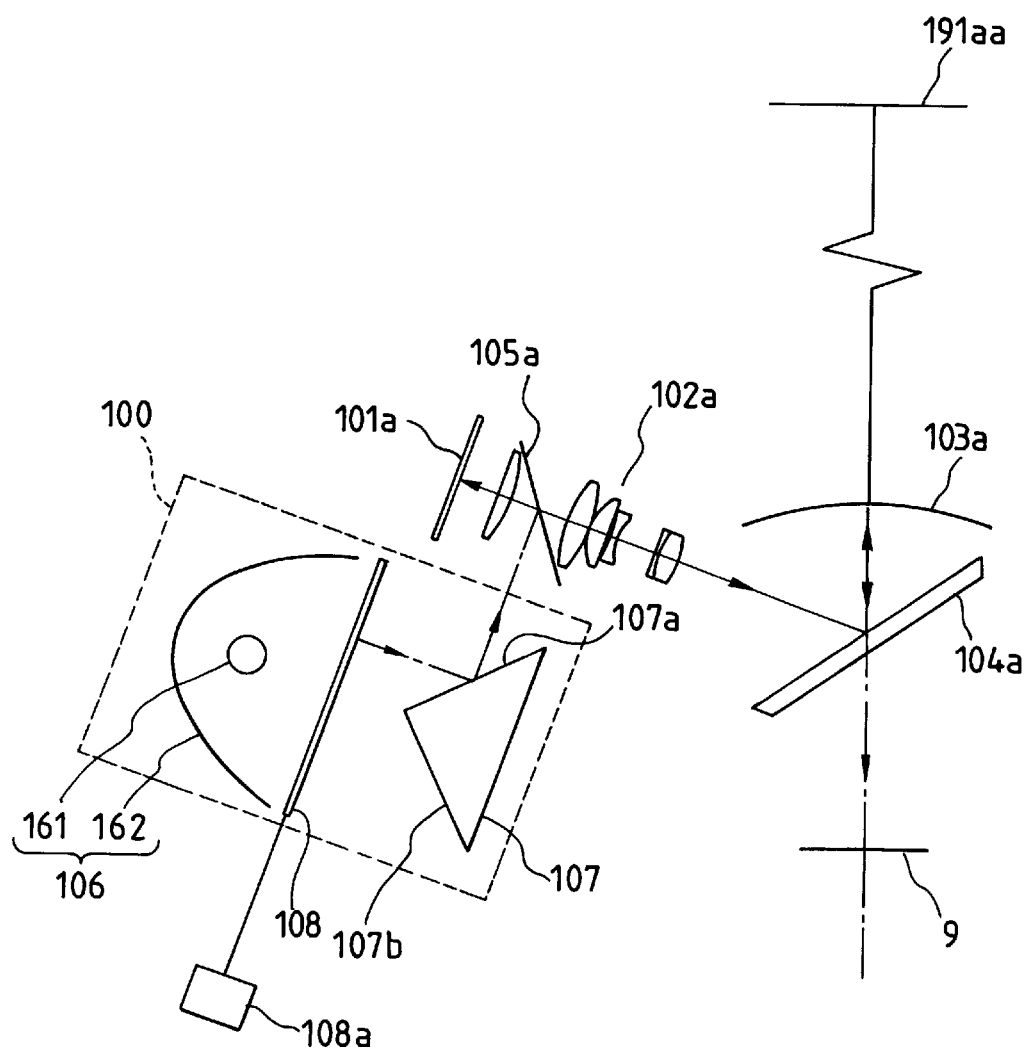
FIG. 12 is an explanatory drawing to show a portion of FIG. 11.

The present embodiment shows an example where main part of the image displaying apparatus is mounted in front of the observer's head. FIG. 12 is an explanatory drawing to flatly show only an illumination system 100 and an optical system for the left eye (or for the right eye) in the image displaying apparatus of FIG. 11. The right eye system is symmetric with the left eye system.

In the drawing, reference numeral 100 designates an illumination system. Further, each of 101a and 101b is an image displaying element composed of a reflection type liquid crystal display device or a spatial light modulator, etc., which is drive-controlled by a drive circuit (not shown) to display image information. Numeral 106 denotes a light source portion, which has a light-emitting portion 161 and a reflective shade 162 for reflecting and collecting beams emitted from the light-emitting portion 161. Numeral 108 is a light-intensity adjusting element, which is for example a liquid crystal device and which adjusts an intensity of transmitted light of the beams from the light source portion 106, based on a signal from an adjusting circuit 108a.

Numeral 107 is an optical element, which is a triangular reflective prism with oblique surfaces 107a, 107b being reflective surfaces and which splits the beams from the light source portion 106 into two light bundles for illuminating left and right image displaying elements 101a, 101b.

Each of 105a and 105b is a semi-transparent mirror, which reflects a beam of reflected light from the optical element 107 toward the image displaying element 101a, 101b. The image displaying element 101a, 101b is arranged to be illuminated with parallel beams. Each of 102a and 102b is an optical system, which is so arranged that a semi-transparent mirror 104a, 104b as will be described later reflects the image information displayed on the image displaying element 101a, 101b so as to display it through a semi-transparent curved mirror 103a, 103b as an enlarged virtual image at a predetermined position 191aa ahead of the observer. Numeral 9 represents the position of the observer's pupil.

In the present embodiment, an image on the image displaying element 101a, 101b illuminated with parallel beams from the illumination system 100 is guided through the semi-transparent mirror 104a, 104b and the semi-transparent curved mirror 103a, 103b by the optical system 102a, 102b so as to be displayed as an enlarged virtual image at the predetermined position 191aa ahead of the observer, so that the observer can observe the image in a same field in a spatially superimposed manner over the image information from the external field.

On this occasion, the transmittance (intensity of transmitted light) of the light-intensity adjusting element 108 is controlled in accordance with the brightness of the external field so as to adjust a balance of brightness between the image information on the image displaying elements 101a, 101b and the image information of the external field, whereby a state of observation of the both image information can be maintained very well.

The image displaying elements in the present embodiment are reflection type liquid crystal displaying devices or reflection type spatial light modulators as called as DMD described in Japanese Laid-open Patent Application No. 60-179781, Japanese Laid-open Patent Application No. 61-210775, etc. These reflection type image displaying elements have excellent utilization factors of illumination light. As a result, high-luminance images can be readily obtained and high contrast can be easily achieved.

Figure 13:
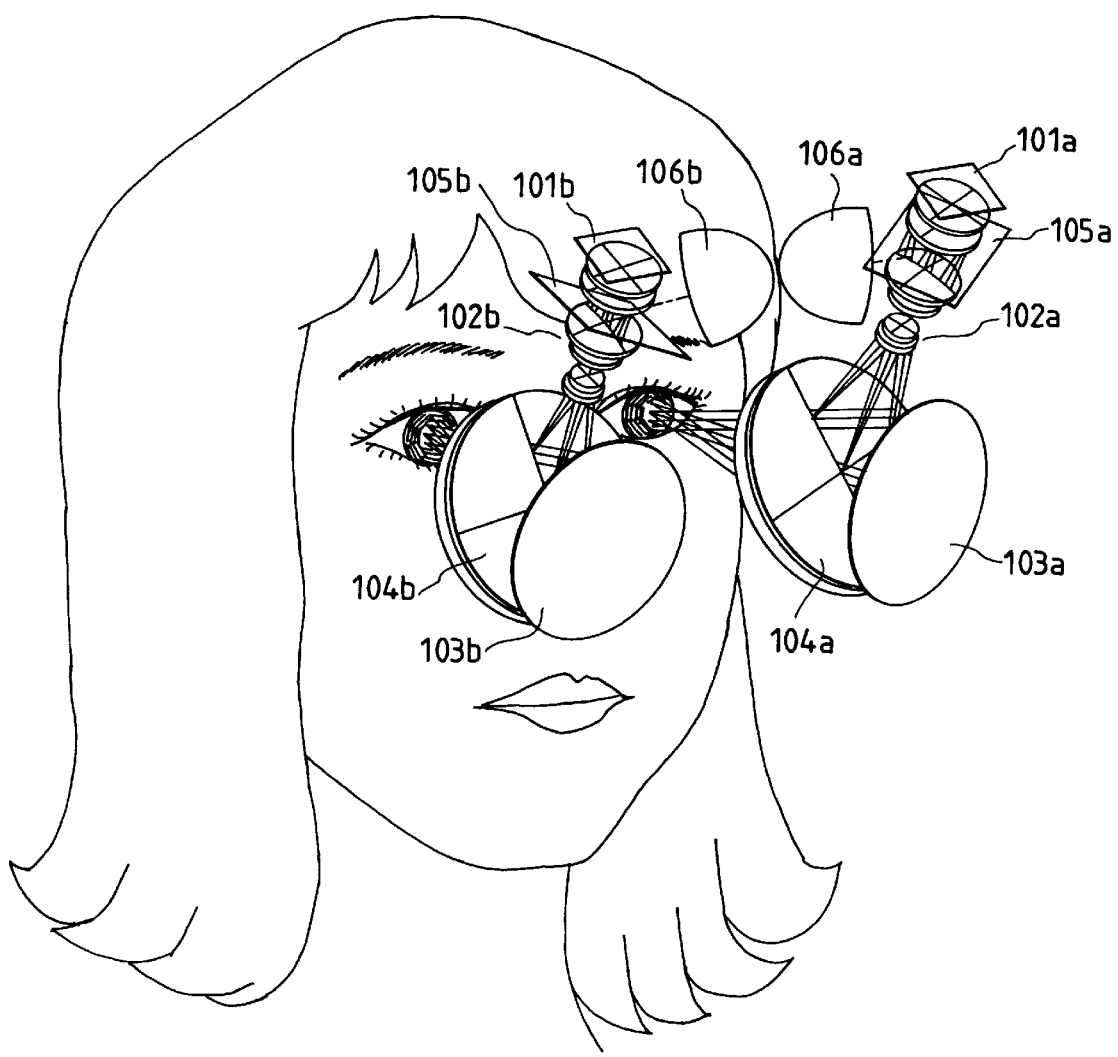
FIG. 13 is a schematic drawing to show major part of embodiment 9 of the present invention.

FIG. 13 is a schematic drawing to show major part of embodiment 9 of the present invention.

The present embodiment is constructed substantially in the same structure as embodiment 8 of FIG. 11 except that a pair of illumination systems each having a light source portion and a light-intensity adjusting element as constituents of the image displaying apparatus mounted in front of the observer's head are provided for the left eye and for the right eye.

In the present embodiment, beams from the light source portion 106a or 106b are guided through the light-intensity adjusting element 108a or 108b (not shown) and reflected by the semi-transparent mirror 105a or 105b to illuminate the reflection type image displaying element 101a or 101b with parallel beams.

Then an image on the reflection type image displaying element 101a, 101b is guided through the semi-transparent mirror 105a, 105b and then displayed through the semi-transparent mirror 104a, 104b and the semi-transparent curved mirror 103a, 103b by the optical system 102a, 102b as an enlarged virtual image at a predetermined position ahead of the observer, so that the observer can observe the image in a same field on a spatially superimposed manner over the image information from the external field, similarly as in embodiment 8.

The present embodiment is also arranged so that the transmittance of the light-intensity adjusting element 108a, 108b set ahead of the light source portion 106a, 106b is controlled in accordance with the brightness of the external field, similarly as in embodiment 8. This control changes the display luminance of image displaying element 101a, 101b so that the observer can observe a superior image together with the image information of the external field.

Figure 14:
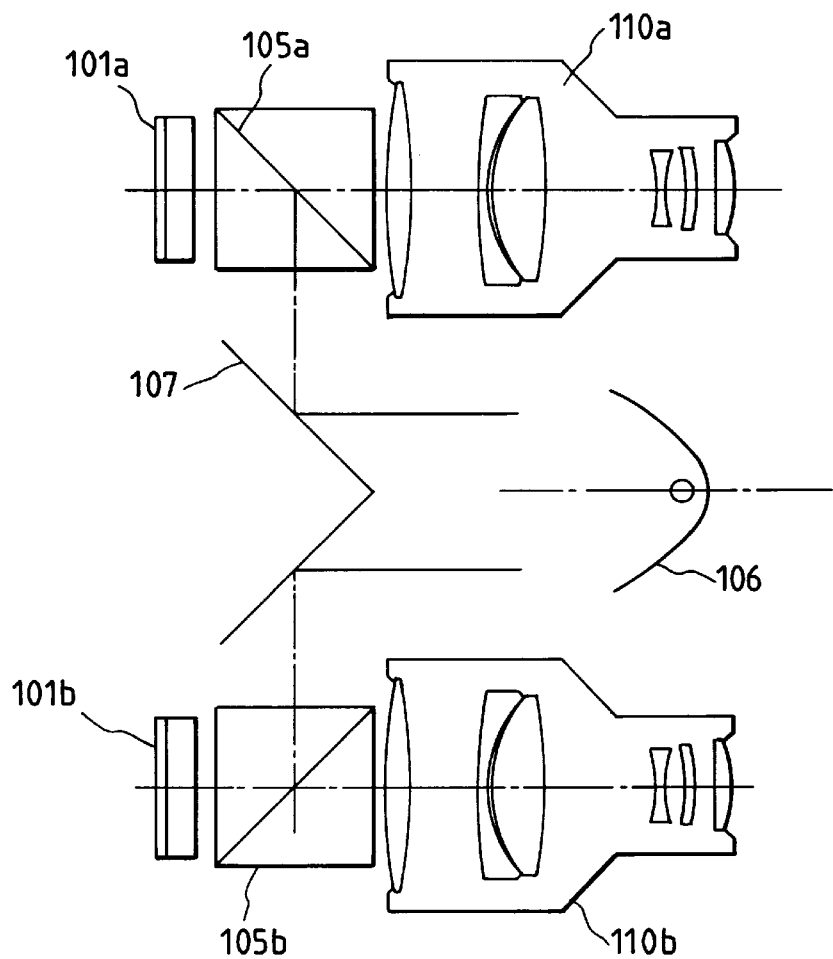
FIG. 14 is an explanatory drawing of an optical system in embodiment 10 of the present invention.

FIG. 14 is an explanatory drawing to show a portion of an optical system in embodiment 10 of the present invention.

The present embodiment is constructed substantially in the same structure as embodiment 8 of FIG. 11 except that telecentric optical systems 110a, 110b are used as the optical systems for displaying images on reflection type image displaying elements 101a, 101b at a predetermined position ahead of the observer.

Here, a telecentric optical system means a system in which the entrance pupil or the exit pupil is set at infinity. In the case of the systems in the present invention, the each telecentric optical system is an optical system in which beams normally reflected at respective positions on the image displaying element 101a, 101b are superimposed on each other at the position of the pupil to form respective images at predetermined positions.

Figure 15:
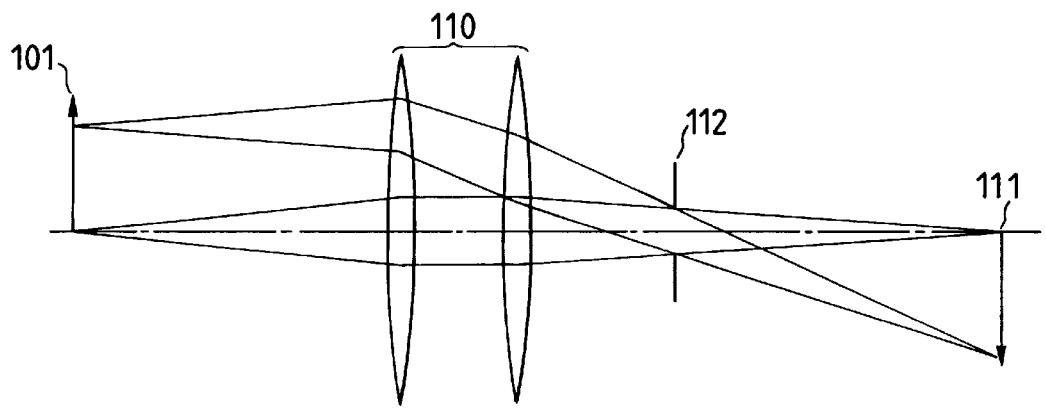
FIG. 15 is an explanatory drawing of the optical system of FIG. 14.

FIG. 15 is an explanatory drawing to illustrate a telecentric optical system 110 in the present embodiment. In the drawing, numeral 112 represents the position of the pupil. FIG. 15 shows a state where the image displaying element 101 is focused at the position 111 by the telecentric optical system 110.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and the all changes which come within the meaning and range of equivalency of the clams are therefore intended to be embraced therein.

What is claimed is:

1. A head mounted display comprising:

a display device for modulating light incident thereon in accordance with image information and reflecting the light;

illuminating means for emitting light; and an optical system for guiding a beam of the light from said illuminating means into said display device and guiding a beam of reflected light from said display device to the pupil of an observer located at a position different from that of said illuminating means, wherein said optical system has a polarization beam splitter, only illuminating light of P-polarized light from said illuminating means is transmitted through said polarization beam splitter to illuminate said display device with the illuminating light, only image display light of S-polarized light modulatingly reflected by said display device is incident on said polarization beam splitter as a second incidence thereon and reflected by said polarization beam splitter to be incident on a concave mirror or a concave half mirror disposed at a position opposing to a direction of the pupil of said observer with respect to said polarization beam splitter by way of a quarter wave plate, and light reflected by said concave mirror or said concave half mirror is again transmitted through said quarter wave plate and incident on said polarization beam splitter as a third incidence thereon and transmitted through said polarization beam splitter to be guided to the direction of the pupil of said observer.

2. An apparatus according to claim 1, wherein said display device comprises a reflection mirror and a transmission-typed liquid crystal panel and a polarizing panel is disposed between said reflection mirror and said transmission-typed liquid crystal panel.

3. An apparatus according to claim 1, wherein said apparatus has a polarizer for changing light incident on said polarization beam splitter from said illuminating means into light of P-polarized component between said illuminating means and said polarization beam splitter.

4. An apparatus according to claim 1, wherein said apparatus has a polarizer for changing light guided to the pupil of said observer from said polarization beam splitter into light of P-polarized component between said polarization beam splitter and the pupil of said observer.

* * * * *

UNITED STATES PATENT AND TRADEMARK OFFICE
CERTIFICATE OF CORRECTION

PATENT : 6,023,253
DATED : February 8, 2000
INVENTOR(S) : Taniguchi et al

It is certified that error appears in the above-identified patent and that said Letters Patent is hereby corrected as shown below:

Column 10, line 17, please delete "RxLCD>RLCD" and insert therefor -- R'LCD>RLCD --.

Column 11, line 61, please delete "1316" and insert therefor -- 13-16 --

Signed and Sealed this

Fifteenth Day of May, 2001

Attest:

NICHOLAS P. GODICI

Attesting Officer          Acting Director of the United States Patent and Trademark Office